July 28, 1953 W. S. JAMES 2,646,885
BY-PASS FILTER ELEMENT
Filed June 30, 1949
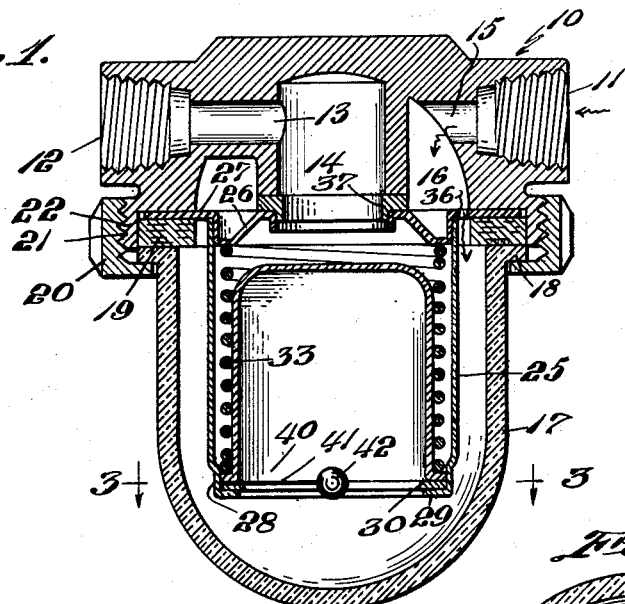
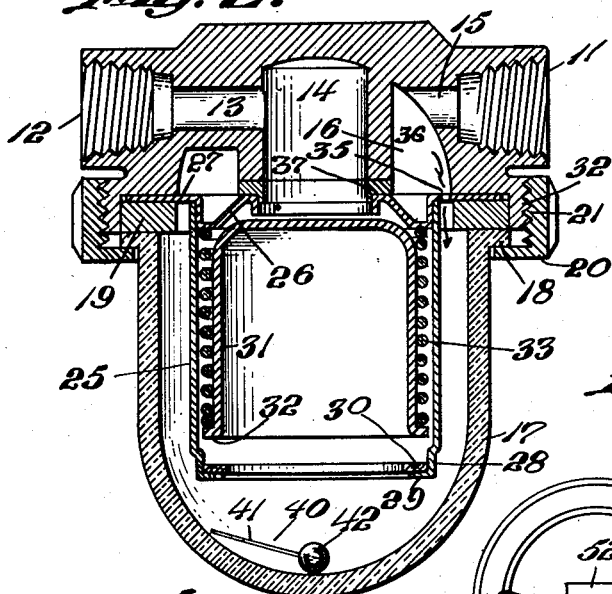
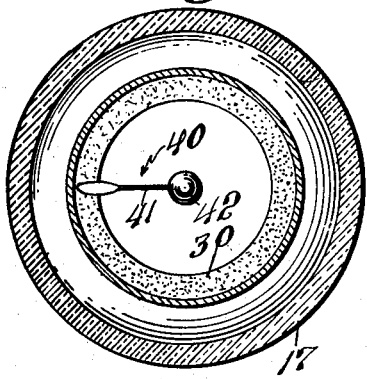
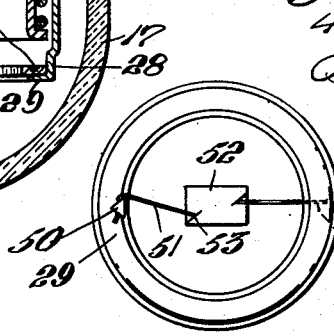
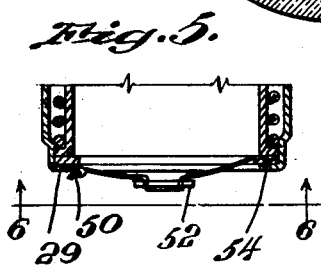
INVENTOR.
William S. James
BY
Barlow & Barlow
ATTORNEYS.

Patented July 28, 1953

2,646,885

UNITED STATES PATENT OFFICE 2,646,885

BY-PASS FILTER ELEMENT

William S. James, Birmingham, Mich., assignor to Fram Corporation, a corporation of Rhode Island Application June 30, 1949, Serial No. 102,409

5 Claims. (Cl. 210—165)

1

This invention relates to a fluid filter, more particularly designed for filtering gasoline. In the filtering of gasoline, it is usual that the filter element be so located that all of the gasoline will pass through the filter in what is usually termed a full flow filter, as distinguished from a by-pass filter. Thus, if such a filter is used in connection with an internal combustion engine and the filtering element becomes clogged by reaching its dirt collecting capacity, no further flow will be had through the filter element. Consequently, the flow of gasoline to the engine will be stopped and it will be necessary to remove the filled filter element in order that the engine may be again started. The removal of the filter for this purpose is not generally known by the user, and consequently it occurs that the engine is out of use until the element may be replaced or removed.

One of the objects of this invention is to provide an arrangement so that should the filter collect sufficient contaminant to become clogged and no longer pass a sufficient amount of fluid for the supply of the engine to which it is attached, there will be a relief or valve means open so that fluid may pass to the engine for the supply of the fuel thereto.

Another object of the invention is to provide some indicating means so that should this flow become clogged and the valve means operate, then the user may be notified of the occurrence and thus replace the element with a fresh one for further use.

Another object of the invention is to provide a signal means which will be readily visible through the transparent bowl which is used in connection with a gasoline filter.

Another object of the invention is to provide an arrangement so that the filter element itself acts as the valve means.

Another object of the invention is to provide a signal which will be released by lifting of the filter element from its seat in acting as the valve means.

Another object of the invention is to provide some indicating device which will be operated by the movement of the filter upon becoming clogged.

With these and other objects in view, the invention consists of certain novel features of construction, as will be more fully described and particularly pointed out in the appended claims.

In the accompanying drawings:

Fig. 1 is a sectional view through the filter showing the filter element on its seat and the

2 indicating means in normal position for operation;

Fig. 2 is a view similar to Fig. 1 illustrating the filter element as raised from its seat acting as a valve and releasing the indicating means;

Fig. 3 is a section on line 3—3 of Fig. 1;

Fig. 4 is a perspective view of the indicating means;

Fig. 5 is a fragmental sectional view of a modified form of indicating means;

Fig. 6 is a plan view of the indicating means looking on line 6—6 of Fig. 5.

In proceeding with this invention, I provide a head and a bowl which is held together by a nut having screw threaded engagement with a head. Within this bowl there is provided a shell through which entering liquid must pass to reach the exit opening in the head. A filter element is positioned in this shell to seat upon a seat in the shell and close the passage therethrough, except that the fluid will pass through the filtering element. An indicating means has at least one end sandwiched between the element and the seat against which it is pressed, so that when released, the weight of it will cause it to move by gravity from such seat to the bottom of the bowl.

With reference to the drawings, 10 designates generally a head which is usually a cast metallic material having an inlet opening 11 which is threaded for connection to a conduit for fluid such as gasoline. There is also provided an exit opening 12 which is similarly threaded for connection to a conduit through which the filtered fluid or gasoline may pass. This exit opening communicates through passages 13 and 14 to the center portion of the head, while the inlet opening 11 communicates through passage 15 to the inner body portion or chamber 16 about the center conduit 14 of the head. A bowl 17, usually of glass, is flanged as at 18 and is held against a soft packing 19 which is urged toward the under surface of the head by a nut 20 having internal threads 21 which engage external threads 22 on the head.

A shell 25 of thin sheet metal has a closure cap 26 with a slotted flange 27 which is held between the gasket 19 and the under surface of the head and extends downwardly into the shell as shown in the drawings. The lower edge of this shell 25 is reduced in diameter as at 28 and is flanged inwardly as at 29 so as to provide a surface for supporting a soft gasket 30 which forms a sealing seat. A filter element 31, consisting of an inverted cup of molded cellulose fiber has a flange 32 of a size so that its outer peripherial edge will engage the inner surface of the reduced portion 28 and its lower surface will engage the soft gasket 30 and by reason of a coiled spring 33 will be forced against this seat 30 to provide a fluid tight fit to prevent passage of fluid into the shell except that which passes through the filter element 31. Spring 33, while engaging on the flange of the filter element 31 at one end, also engages the closure 26 which has a downwardly sloping surface and a flange 27 to rest upon the top of the shell 25. This flange 27 is provided with a plurality of slots 35 so as to provide for the liquid passing into the bowl as shown by arrow 36. A soft gasket 37 also serves to seal the cap 26 at its upper edge from the entrance flow of liquid into the device.

An indicator designated generally 40 (Fig. 4) is provided with an arm 41 having a weighted ball 42 at one end and flattened as at 43 at the other end. This weighted arm has its flattened portion 43 positioned between the flange 32 of the filter element and its soft seat 30 so that it will be held in a horizontal position extending radially inwardly with the weighted ball at substantially the center of the element, which position it will assume until the element lifts, compressing the spring and thus releasing the indicating means. By reason of the edge of the flange 32 engaging the reduced portion 28 of the shell, it will be necessary for the filter element to lift substantially the axial extent of this reduced portion before obtaining relief, thus insuring that the element will lift a sufficient amount to completely release the indicating means to permit it to drop to the bottom of the bowl.

In operation, the fluid will pass inwardly through the opening 11 down through the slots 36 into the bowl 17 and upwardly into the shell 25 and through the filter 31 and thence out through the conduits 14, 13, and 12. Should the filter element 31 become clogged, the strength of the spring 33 is such that the filter element will lift from its seat 31 to permit the passage of fluid around the outer edge of flange 32 of the filter element 31 which is spaced from its shell 25 as shown in Fig. 2 and at the same time the indicator 40 being relieved of pressure upon its ends 43 will permit the arms 41 to drop and become displaced from the seat 30 to rest on the bottom of the bowl. The bowl being transparent, the same will be readily visible so that one looking at the filter will know that the element has become clogged and is only permitting operation by moving to a by-pass position. Thus, if the filter has been left too long or the contaminant has been unduly heavy, a positive indication is shown that a change should be made.

In some cases, a different form of indicating means may be utilized and a projection 50 will be formed integral with the flange 29 of the shell, so as to secure a flexible element such as a cord 51 between it and the flange 29 by pressing the same tightly against the under surface of the flange. This flexible element may be a thread or cord which may be disposed between the flange 32 and the washer 30 of the element so as to be held by a spring which forces the element downwardly. In order that this flexible material or cord may be more visible, a flag 52, which may be of metal and serve as a weighting means, is fastened on this cord such for instance as by slitting the metal at 53 and drawing the cord into the slits. It will be apparent that when the element raises, the cord will have its end 54 move from its clamped position and will drop toward the bottom of the bowl, where it will be readily visible.

I claim:

1. In a fluid filter, a head provided with means for the entrance and exit of fluid to be filtered, a bowl, means providing a passage from the entrance through the bowl to the exit, an annular sealing seat provided along said passage, a guiding cylindrical surface of short axial extent adjacent said seat with its axis at right angles to the plane of said seat and a larger cylindrical surface beyond said guiding surface and connected thereto by an inclined wall, a filtering element in said passage having an annular flange with its peripherial edge slidably engaging said guiding surface, resilient means urging said element along said guiding surface and against said seat to provide a seal but of a strength to permit said element to axially move beyond said guiding surface into the area of said larger surface should the element become clogged.

2. In a liquid filter as in claim 1, with an indicator, means to mount said indicator to be moved in response to the movement of said filtering element from said seat.

3. In a liquid filter as in claim 1, wherein said bowl is transparent and a weighted member is held between said filter element and its seat when in seated position but released when said element is raised from said seat.

4. In a liquid filter as in claim 1, wherein said bowl is transparent and a weighted member having a flattened portion is held between said filter element and its seat when in seated position but released when said element is raised from said seat.

5. In a liquid filter as in claim 1, wherein said bowl is transparent and an arm is held between said filter element and its seat when in seated position but released when said element is raised from said seat, said arm having a weighted ball at one end and a flattened end held on said seat.

WILLIAM S. JAMES.

References Cited in the file of this patent

UNITED STATES PATENTS

| Number | Name | Date |
| --- | --- | --- |
| 1,506,967 | Bosworth | Sept. 2, 1924 |
| 1,688,326 | Boulade | Oct. 23, 1928 |
| 2,183,616 | Korte | Dec. 19, 1939 |
| 2,348,651 | Schelly | May 9, 1944 |
| 2,406,308 | Vokes et al. | Aug. 20, 1946 |
| 2,412,232 | Sutton | Dec. 10, 1946 |
| 2,563,786 | James | Aug. 7, 1951 |

FOREIGN PATENTS

| Number | Country | Date |
| --- | --- | --- |
| 263,017 | Great Britain | Dec. 23, 1926 |
| 294,706 | Great Britain | Aug. 2, 1928 |